(12) United States Patent
Kang et al.

(10) Patent No.: US 7,087,171 B2
(45) Date of Patent: Aug. 8, 2006

(54) METHOD FOR SELECTIVE RECOVERY AND DEWATERING SEWAGE SLUDGE BY USING SLUDGE-COAL-OIL CO-AGGLOMERATION

(75) Inventors: Sung-Kyu Kang, Daejeon (KR); Hyun-Dong Shin, Seoul (KR)

(73) Assignee: Korea Institute of Energy Research, Daejeon (KR)

( * ) Notice: Subject to any disclaimer, the term of this patent is extended or adjusted under 35 U.S.C. 154(b) by 155 days.

(21) Appl. No.: 10/783,458

(22) Filed: Feb. 19, 2004

(65) Prior Publication Data

US 2004/0232085 A1    Nov. 25, 2004

(30) Foreign Application Priority Data

May 20, 2003    (KR) ............... 10-2003-0031796

(51) Int. Cl.
    *C02F 11/14*    (2006.01)
(52) U.S. Cl. ............ 210/609; 44/552; 210/710; 210/727; 210/728; 210/738; 210/772
(58) Field of Classification Search ............... 44/552; 210/609, 728
    See application file for complete search history.

(56) References Cited

U.S. PATENT DOCUMENTS

| | | | | |
|---|---|---|---|---|
| 2,226,532 A | * | 12/1940 | Hawley et al. ............. | 210/634 |
| 3,933,634 A | * | 1/1976 | Seki ............................. | 210/710 |
| 4,196,077 A | * | 4/1980 | Berkowitz et al. .......... | 210/634 |
| 4,560,391 A | * | 12/1985 | Ashworth ..................... | 44/282 |
| 4,840,736 A | * | 6/1989 | Sander et al. ................ | 210/727 |
| 4,874,393 A | * | 10/1989 | Mikhlin et al. ............... | 44/572 |
| 5,051,487 A | * | 9/1991 | Bhattacharyya et al. .... | 526/287 |
| 5,125,931 A | * | 6/1992 | Schulz .......................... | 44/552 |
| 5,402,946 A | * | 4/1995 | Geiger et al. ................. | 241/17 |
| 5,645,614 A | * | 7/1997 | Dummersdorf et al. ....... | 44/596 |

\* cited by examiner

*Primary Examiner*—Peter A. Hruskoci
(74) *Attorney, Agent, or Firm*—Cooper & Dunham LLP

(57) ABSTRACT

Disclosed herein is a method for dewatering sewage sludge by using sludge-coal-oil co-agglomeration ("SOCA") which comprises the steps of physically, chemically or biologically conditioning sludge to impart hydrophobicity and lipophilicity to the sludge (conditioning step), supplying oil and coal to the conditioned sludge with stirring to form sludge-coal-oil agglomerates (agglomerating step), enlarging the particle diameter of sludge-coal-oil agglomerates (size enlargement step), and remaining the enlarged sludge-coal-oil agglomerates over a sieve to selectively separate them from hydrophilic materials dispersed in tailing water(screening step).

According to the method, since sludge can be rapidly, easily and effectively dewatered and purified when compared to conventional sludge treatment methods. In addition, there is no risk of involving malodor and air pollution. Furthermore, the dewatered sludge can be utilized as a high-quality fuel.

5 Claims, 2 Drawing Sheets

METHOD FOR SELECTIVE RECOVERY AND DEWATERING SEWAGE SLUDGE BY USING SLUDGE-COAL-OIL CO-AGGLOMERATION

BACKGROUND OF THE INVENTION

1. Field of the Invention

The present invention relates to a method for dewatering sewage sludge by a process wherein only organic materials are selectively purified and recovered from a suspension of hydrophilic inorganic materials and organic materials present in sewage sludge based on the hydrophobicity of carbohydrates. More particularly, the present invention relates to a method for dewatering sewage sludge by sludge-coal-oil co-agglomeration (hereinafter, abbreviated as "SOCA") which comprises lipophilically conditioning the surface of sludge and mixing the surface-conditioned sludge with fine oil particles to form sludge-oil agglomerates in the form of small spheres. The sludge-oil agglomerates are formed when the fine oil particles cover the surface of the lipophilic and hydrophobic sludge. According to the dewatering method of the present invention, sludge can be effectively dewatered.

2. Description of the Related Art

In order to better understand the background of the present invention, conventional techniques and current technological situation concerning the treat of sewage sludge are provided below.

Unit processes currently used to treat and dispose of sewage sludge are classified into the following categories according to their purpose and functions.

---

Concentration => Anaerobic digestion => dewatering =>

=> Drying → landfill, soil conditioner
    => Composting → soil conditioner, fertilizer for green agricultural land after examining harmfulness
    => Earthworm feed → earthworm breeding, soil conditioner
    => Solidification → landfill, soil coverings
    => Incineration → landfill, construction materials (raw materials of bricks and cement) using incinerated ash
    => Melting → construction materials (pavement materials, lightweight aggregates, blocks), landfill
    => Pyrolysis → fuels, e.g., gas, oil, char, etc.
    => Ground-landfill
    => Coastal-landfill
    => Ocean dumping

---

As explained above, the sludge treatments are divided into a pretreatment process, an intermediate treatment process and a final treatment process. The pretreatment process for the weight reduction of sludge includes concentration, digestion and mechanical dewatering. The intermediate treatment process for the weight reduction and stabilization of dewatered cakes includes composting, incineration, melting, solidification and the like. Most final waste products obtained after the final treatment process are commonly buried without drying, or reused. Leachate generated from the buried waste products becomes a serious problem. In addition, since environmental regulations have recently become more stringent for ground-landfill/coastal-landfill and ocean dumping, special attention has been paid to incineration processing.

Incineration is a process wherein combustible materials are burned using oxygen present in the air. In order to solve the problem of insufficient available landfill sites, weight reduction of waste materials and stabilization for treating septic matters by transforming organic materials into inorganic materials, are widely used as processes for treating waste materials. Since incineration processing is advantageous in that the waste heat released during incineration of waste materials can be reused for electricity generation and district heating, it has been used to treat municipal waste materials for a long time. In the case of hazardous waste materials, weight reduction of sludge is preferential over stabilization and safety effects because of limited landfill sites, particularly, in metropolitan areas. In most big cities of industrialized countries, conventional landfill processing is increasingly changed toward incineration processing.

The major benefits of incineration processing are sanitary disposal, no septicity, less disgust than dewatered cakes, and volume reduction to 10~20% of the initial volume of sludge.

Since concentrated sludge generated from a sewage terminal treatment plant contains a water content of 95% or more, it needs to be dewatered for subsequent processing. The use of a general method for dewatering sludge by mechanical dewatering enables the water content to be reduced to 75~85% (see, FIG. 1).

Following dewatering, the sludge is dried and then incinerated. The heat values of some types of sludge are shown in the following table.

| Type of sludge | Heating value in total solids (kJ/kg) Range | Representative value |
|---|---|---|
| Raw sludge | 23,000–29,000 | 25,000 |
| Surplus sludge | 20,000–23,000 | 21,000 |
| Anaerobically digested sludge | 9,000–14,000 | 12,000 |
| Chemically settled sludge | 14,000–18,000 | 16,000 |
| Biologically treated sludge | 16,000–23,000 | 20,000 |

*1 kJ = 0.2389 kcal

On the other hand, the content of heavy metals in sludge depends largely on cities and seasons. Analytical data of heavy metals contained in typical municipal sewage sludge of an industrially advanced country are shown in the table below.

| Element | Range (ppm) | Average Value (ppm) | Element | Range (ppm) | Average value (ppm) |
|---|---|---|---|---|---|
| Ag | <3–7 | 3 | K | 920–1,900 | 1,300 |
| Al | 5,400–12,000 | 9,000 | Li | <2–7 | 2 |
| Ba | 47–50 | 170 | Mg | 880–7,400 | 1,600 |
| Ca | 5,900–17,000 | 9,800 | Mn | 50–240 | 130 |
| Cd | 2–22 | 9 | Na | 1,800–7,400 | 4,500 |
| Co | <3–5 | 3 | Ni | 9–90 | 22 |
| Cr | 20–100 | 55 | Pd | 110–1,500 | 330 |
| Cu | 80–900 | 350 | Sb | 20–40 | 45 |
| Fe | 1,000–3,500 | 2,300 | Sn | <20–40 | 20 |
| Hg | 0.66–1.9 | 1.2 | Zn | 200–2,500 | 780 |

Centrifugal dewatering, vacuum dewatering using a partial pressure difference between phases and press dewatering are now commercially available to dewater sewage sludge, all of which are processes using a filter. In addition to these processes, a lagoon process wherein sludge in a concentration tank is subjected to solid-liquid separation by a sand filter layer and then dried in ambient air can be used to dewater sewage sludge. The advantages and drawbacks of the above-mentioned processes are explained in the table below.

| Dewatering process | Advantages | Drawbacks |
|---|---|---|
| Centrifugal dewatering | Clean working environment, less malodor and contamination, easy start/stop operation<br>Relatively high dewatering rate<br>Low equipment cost compared to capacity<br>Small occupied area compared to other equipments | Considerable abrasion of scroll → high maintenance cost<br>Previous removal of sand or hard inorganic materials required<br>Skilled person for operation required<br>Appropriate filtering aid required |
| Continuous-type press dewatering | Less energy consumption<br>Relatively low-cost equipment and operation cost<br>Simple mechanical structure and easy maintenance<br>Possible high-pressure operation for high dewatering rate<br>Very easy start and stop operation | Severe malodor<br>Complete removal of fine sludge and large impurities required<br>Sensitivity to sludge feeding conditions<br>Completely automatic operation not preferred |
| Batch-type press dewatering | Formation of filter cakes having excellent dewatering effects<br>Excellent filtering effects and fewer suspended substances in filtrate | Discontinuous operation → high labor cost<br>High equipment cost and support structures required<br>Large operation space and skilled person required<br>Filtering chemicals required → further sludge generation |
| Sludge drying bed | Lowest equipment cost, if space is permitted<br>Relative insensitivity to sludge feeding conditions → no skill required to operate<br>Less energy consumption and use of small amounts of chemicals<br>High content of solids, compared to mechanical processes | Large area required<br>Digested sludge required<br>Sensitivity to weather and difficult operation in winter<br>Intensive labor for removal of sludge and cleaning of concentration tank required |
| Sludge lagoons | Less energy consumption and no need for chemical addition<br>Complete digestion of organic materials<br>Low equipment costs, if space is permitted, and no skill required to operate | Malodor and contamination of pathogens<br>Leachate generation<br>Large area and poor appearance<br>Sensitivity to weather and difficult operation in winter |

Meanwhile, in order to better improve the dewatering properties during dewatering of sludge or solid microorganisms, a chemical conditioning or stabilization treatment of sludge is performed. In addition to the chemical conditioning treatment, a physical heating treatment and a freeze-thaw treatment are used. However, since these treatments are economically disadvantageous in terms of their operation, they are limited to small-scale industrial processes.

The chemical conditioning treatment is evaluated to be the most economical sludge dewatering treatment, in terms of high recovery rate and compatibility with other treatments. Depending on the type of sludge to be treated, the chemical conditioning treatment can lower the water content of sludge from 90~99% to 65~85%. According to the chemical conditioning treatment, simple coagulation between sludge and sludge solids takes place, and as a result, absorbed water is discharged (dewatering). The chemical conditioning treatment is commonly used in processes, e.g., centrifugal dewatering, belt-filter press or pressure filter treatment, where a more elaborate dewatering is required. As chemicals used for the chemical conditioning treatment, iron chlorides, limestone, alum, polymeric materials, etc., are used. In the case that a polymeric material is used as a chemical for the chemical conditioning treatment, additional non-combustible inorganic sludge is not generated. However, in the case that an iron chloride or limestone is used as a chemical for the chemical conditioning treatment, 20~30% of sludge based on dried sludge is further generated. The chemical for the chemical conditioning treatment is properly selected according to the concentration of entering sludge and reaction conditions of a reaction solution, for example, pH, alkalinity, reaction time. For instance, a large amount of limestone is required to dewater sludge to a high extent and to increase pH and alkalinity. At this time, a large amount of ammonia gas is evolved during sludge dewatering and additional sludge is generated. The choice of a chemical also depends on the dewatering processes employed, e.g., the polymeric material is mainly used in the centrifugal dewatering process and belt-filter press treatment, but is not suitable in the pressure filter treatment. The amount of entering sludge generally varies according to the characteristics of the entering sludge. As the dewatering of sludge becomes difficult, the amount of the chemical addition increases, the formation of dry cakes is difficult and filtering efficiency is poor. Generally, dewatering of untreated primary sludge is easiest. Mixed sludge containing the untreated primary sludge, anaerobically treated sludge and aerobic sludge follow the untreated primary sludge in terms of ease of dewatering.

As other conditioning treatments, heat treatment, preheating treatment, freeze-thaw treatment and the like can be mentioned. According to the heat treatment for sludge conditioning and stabilization, sludge is heated under pressure for a short time to destroy its gel-structure and to reduce its hydrophilicity. As a result of these heat-treating effects, even moisture present within microorganisms can be removed and the water content of dry cakes can be reduced to 30~50%. In addition, since no additional conditioning treatment is required, the formation of sludge having a heating value of about 30 kJ/g is possible. However, the drying process has disadvantages that a large quantity of noxious gases, including ammonia, is evolved during heat-treating and a supernatant having a high BOD is formed. Accordingly, an additional secondary treatment of wastewater and air is indispensable to remove the noxious gases and supernatant. Furthermore, since equipment used for the heat treatment is very expensive, the heat treatment is partially used in a small-scale process.

The preheating treatment is based on the fact that the preheating of sludge to about 60° C. can increase the dewatering effects of sludge by about 6%. However, since the preheating treatment requires recirculation of filter-treated water having a high BOD, it can be effectively utilized in areas using waste heat.

According to the freeze-thaw treatment, repeated freezing and thawing changes the jelly-structured sludge into fine granules so that the filtering resistance is reduced and thus the sludge is effectively dewatered. The freeze-thaw treatment is ineffective to dewater bound water, but is effective for relatively hard-to-dewater materials. The dewatering operation of the freeze-thaw treatment is relatively easy, and the water content in cake residues can be reduced to 25~40%.

SUMMARY OF THE INVENTION

Therefore, the present invention has been made in view of the above problems, and it is an object of the present invention to provide an improved method for dewatering sewage sludge by replacing water bound to the surface of sludge with oil, and separating the sludge-oil agglomerates by screening, thereby improving dewatering and purifying effects. According to the method of the present invention, since sludge can be rapidly, easily and effectively dewatered and purified in comparison with conventional sludge dewatering methods, costs taken to dewater sludge can be considerably reduced and facilities associated with sludge treatment can be greatly simplified. In addition, there is no risk of involving malodor and air pollution. Furthermore, the dewatering method of the present invention has an advantage that the dewatered sludge can be utilized as a high-quality fuel.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention will now be described in more detail with reference to the accompanying drawings and preferred examples.

A method for dewatering sewage sludge according to the present invention is accomplished by a process wherein only organic materials are selectively purified and recovered from a suspension of hydrophilic inorganic materials and organic materials present in sewage sludge based on the hydrophobicity of carbohydrates. According to the method of the present invention, the surface of sludge is lipophilically conditioned, and then the surface-conditioned sludge is mixed with macro-sized oil droplet act as a bridging agent to form agglomerates of hydrocarbon in the form of small spheres, thereby effectively dewatering the sludge. At this time, the sludge-oil agglomerates are formed when the fine oil particles cover the surface of the lipophilic and hydrophobic sludge. This formation of small and hard sludge-oil agglomerates reduces the amount of water bound to the surface of sludge, and facilitates selective separation of the agglomerates from unagglomerated materials, such as metals and ash components, and dewatering. However, when sludge and oil are difficult to form small and hard agglomerates, a lipophilic coagulant aid such as coal may be added thereto. The addition of coagulant aid improves agglomeration and dewatering effects and enhances the applicability of the dewatered sludge as a fuel.

Figure 1:
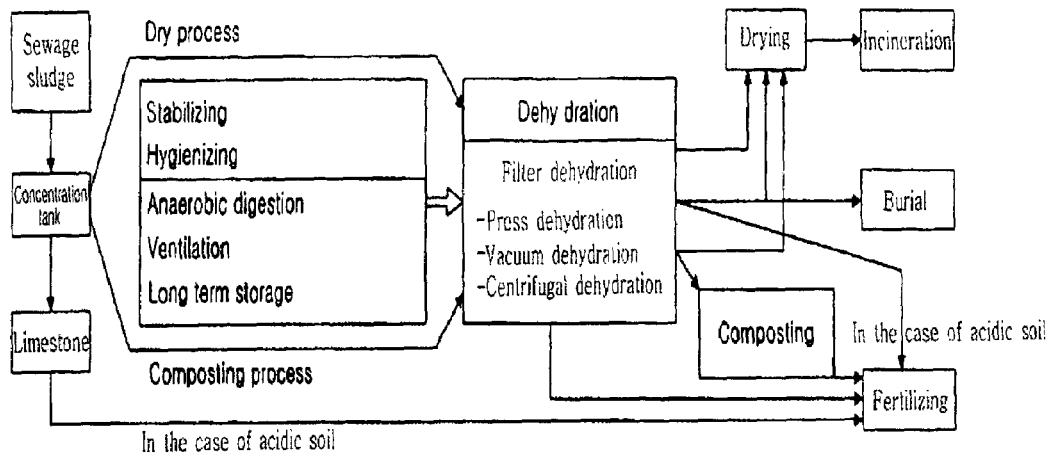
FIG. 1 is a diagrammatic representation of a general method for dewatering sludge by mechanical dewatering.
Figure 2:
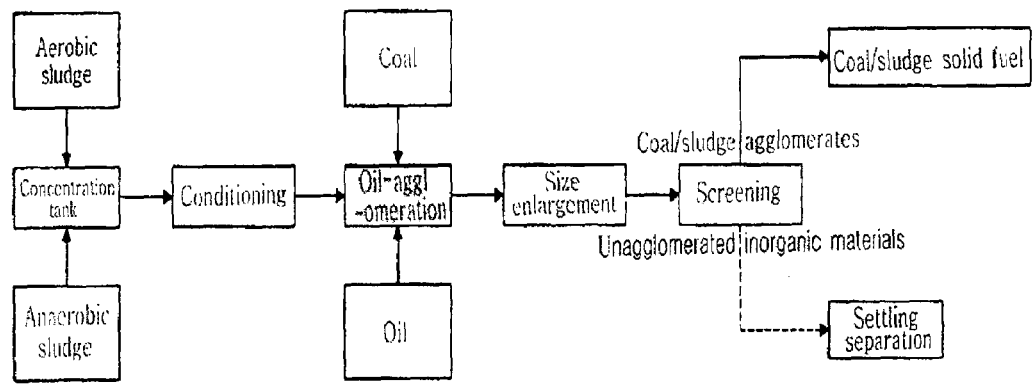
FIG. 2 is a diagrammatic representation of a method for dewatering sludge according to the present invention.

FIG. 2 is a conceptual diagram showing the overall steps of the method for dewatering sewage sludge according to the present invention.

Referring to FIG. 2, foul drainage, household wastewater and livestock wastewater introduced into a sewage terminal treatment plant, aerobically or anaerobically digested sludge thereof, a primary sludge passed through a sedimentation basin, etc., are transferred and recycled from a concentration tank to a dewatering tank where the wastewater and the sludge are chemically or physically conditioned to impart hydrophobicity to them. The conditioning treatment is carried out depending on the state of the wastewater and the sludge. If necessary, the conditioning treatment is omitted.

For the agglomeration of sludge with oil, affinity of oil playing a roll in bridging between solid particles is the most important factor. Oil may be present in various states, for example, pendular, funicular, capillary and suspended states, according to the oil concentration. Oil in a funicular state has the highest agglomeration force, whereas oil in a suspended state is the lowest in agglomeration force.

Such agglomeration force is commonly obtained from the relationship: agglomeration force=(1-porosity)/(diameter of agglomerates)$^2$. In order to obtain a high agglomeration force, it is preferred that the diameter and the porosity of agglomerates are low. Oil droplets having a small diameter and agglomerates having a low porosity can be easily accomplished by mechanical stirring. The higher the stirring speed, the harder and smaller the agglomerates. However, too high a stirring speed makes the formation of agglomerates difficult.

Coal and oil can be supplied in various forms, e.g. coal fines, coal/water slurry and coal/water/oil, and the supply of oil can be varied by the bridging characteristics between sludge and oil. The stirring speed can be varied stepwise, e.g., from high speed to low speed according to the bridging characteristics between sludge and oil. The stirring time may be varied depending on the stirring speed.

For instance, the oil agglomeration is carried out by feeding coal and oil to the conditioned sludge while stirring at a high speed, to form sludge-coal-oil agglomerates having a diameter of 500 μm or more. After the agglomeration, an operation for increasing the agglomeration force of the agglomerates may be performed.

Alternatively, the oil agglomeration may be carried out by simultaneously feeding coal and oil to the conditioned sludge.

Alternatively, the oil agglomeration may be carried out by separately agglomerating the conditioned sludge and coal with oil (a first agglomeration), mixing the first agglomerates, and agglomerating the mixture (a second agglomeration).

Alternatively, the oil agglomeration may be carried out by agglomerating the conditioned sludge with oil (a first agglomeration), adding coal and oil to the first agglomerates, and agglomerating the mixture (a second agglomeration).

Alternatively, the oil agglomeration may be carried out by agglomerating coal with oil (a first agglomeration), adding the conditioned sludge to the first agglomerates, and agglomerating the mixture (a second agglomeration).

The oil used for the agglomeration of sludge with oil is selected from heavy oil, light oil, kerosene, cooking oil, waste cooking oil, castor oil, soybean oil, hempseed oil, waste lubricant and mixtures thereof.

Size enlargement treatment is carried out to improve the bonding strength between sludge and a coagulant aid. As mixers usable for size enlargement, agitation, tumbling, disk, drum-form mixers can be mentioned. Depending on the state of the agglomerates, the size enlargement treatment may be omitted, or oil or a third organic coagulant may be further added.

Since the size-enlarged sludge/coal agglomerates commonly have a particle diameter of about 0.5~3 mm, they can be selectively separated by passing them through a sieve having 48 mesh or less. In addition, since the agglomerates contain some fine inorganic suspended substance particles, the spray of the agglomerates with clean water can obtain highly purified sludge/coal agglomerates.

In connection with the dewatering and conditioning treatments of sludge, the method of the present invention is highly distinguished from a conventional method, as described in Table 1 below.

TABLE 1

|  | Conventional method | Inventive method |
|---|---|---|
| Dewatering treatment | Physical filtering | Screening |
| State of dewatered sludge | Sludge-sludge coagulation | Sludge-coal-oil agglomeration |
| Purpose and procedure of conditioning treatment | Adjustment of pH and alkalinity so as to facilitate the coagulation between sludge, addition of polymeric material, addition of inorganic materials, e.g., limestone so as to facilitate the dewatering of filtering layer | Adjustment of pH and alkalinity so as to impart hydrophobicity to the surface of sludge, addition of polymeric material, addition of coal and oil while stirring to form small agglomerates |
| Characteristics of dewatered cake | Water content: 65~80% Change in the amount of sludge: more than the amount of entering sludge Heating value: 1,200~1,800 kcal/kg Heavy metals: large quantities | Water content: 40~65% Change in the amount of sludge: less than the amount of entering sludge Heating value: >6,500 kcal/kg Heavy metals: very small quantities |
| Characteristics of dewatering treatment | Type: filtering Dewatering time: relatively long Dewatering operating conditions: complex, skill required Additional processes: drying, processes for preventing heavy metal contamination | Type: screening Dewatering time: very short Dewatering operating conditions: simple, skill not required Additional processes: sedimentation/separation of inorganic materials, dewatering |

TABLE 1-continued

| | Conventional method | Inventive method |
|---|---|---|
| Utilization of dewatered sludge | Conventional fields | Agglomerated sludge - high-quality clean fuel<br>Unagglomerated sludge - aggregate materials, landfill |
| Occurrence of dioxin | Possible occurrence of dioxin due to the presence of salts in household sewage upon incineration | Decreased in the amount of salts in agglomerates due to the agglomeration and separation of hydrophobic materials |

According to the method of the present invention, water bound to the surface of sludge is replaced with oil, and the sludge-oil agglomerates are separated by screening, thereby improving dewatering effect and considerably reducing equipment, operation, labor and maintenance costs taken for the dewatering treatment when compared to conventional sludge treatment methods.

Since sludge dewatered by conventional sludge treatment methods has a high water content, drying is additionally required prior to incineration or transfer of the dewatered sludge to other regions. In addition, since the dewatered sludge has a low heat value, an auxiliary fuel may be necessary. However, since combustible coal and fuel oil are used and inorganic materials present in sludge are removed by the method of the present invention, the sludge dewatered by the method of the present invention can be used as a high-quality fuel having a high heating value. In addition, when dewatered sludge is incinerated in the vicinity of a sewage terminal treatment plant, transportation expenses can be reduced. The dewatered sludge can be transformed into a fuel for thermal power plants or district cooling and heating facilities. Since sludge dewatered by conventional methods contains large quantities of heavy metals and ash components, malodor is generated upon drying and the ash components are melted or scattered upon incinerating. Accordingly, additional complex facilities for controlling air pollution are required. The method of the present invention can simplify air pollution control facilities and enables clean working environments.

On the other hand, sludge dewatered by conventional methods can be transformed into a fertilizer or feed, but the sludge dewatered by the method of the present invention cannot be used as a fertilizer or feed due to the presence of fuel oil. It is, however, expected that the replacement of the fuel oil with cooking oil enables it to be used as a highly purified and effective feed.

EXAMPLES

I. Improvement of Dewatering Rate and Recovery Rate

Figure 3:
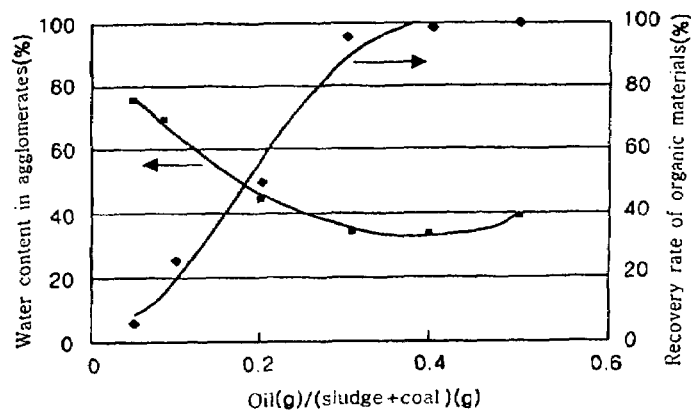
FIG. 3 is a graph showing changes in the dewatering rate of sludge-coal agglomerates and the recovery rate of organic materials according to varying amounts of oil added.

Dewatering of sludge is dominantly influenced by oil playing a roll in bridging the agglomeration with organic materials. In a state where the amounts of coal, sludge and other factors are fixed, changes in the water content of agglomerates and recovery rate of organic materials according to varying amounts of oil added are shown in FIG. 3. When the amount of oil added is small, the organic materials and the oil are present in a pendular state where which the agglomeration force between the organic materials and the oil is weak, and water present between organic material particles causes insufficient agglomeration, thus lowering the recovery rate of the organic materials. However, when the amount of oil is large, the bridging state between organic materials and oil are changed into a funicular state where the water content is low and the recovery rate of the organic materials is greatly improved. When oil is excessively added, the bridging state is changed into a capillary state where no or few changes in the water content and the recovery rate of the organic materials are made lower.

Figure 4:
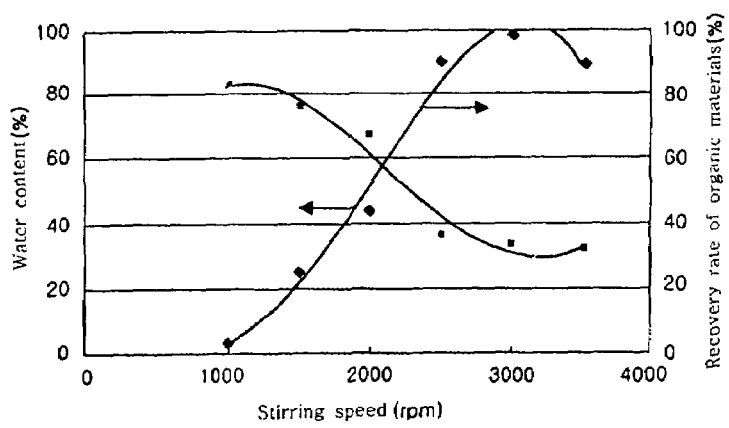
FIG. 4 is a graph showing changes in the dewatering rate of sludge-coal agglomerates and the recovery rate of organic materials according to varying stirring speeds.

On the other hand, stirring speed under the same conditions affects the formation and destruction of agglomerates, and the formation of fine oil particles. FIG. 4 shows changes in the water content and recovery rate of organic materials according to various stirring speeds after addition of certain amounts of coal and oil to conditioned sludge. When the stirring speed is too low, the oil is insufficiently dispersed so that agglomerates are seldom formed. In addition, some organic materials contained in the coal and sludge wet by the oil remain suspended, and the suspended organic materials act like an emulsion and may clog small meshes of a sieve. The increase in the stirring speed to some extent drastically increases the recovery rate of the organic materials and lowers the water content in the agglomerates. However, when the stirring speed is too high, the recovery rate is low despite small diameter of the agglomerates and low water content. The stirring speed is appropriately controlled according to the contact angle with the organic materials. When the viscosity of fuel oil is high, the stirring speed should be preferably maintained at a high level. Although the shear force varies according to the shape of the stirring apparatus used, it is maintained at almost the same level in the batch-type and continuous-type apparatuses. In particular, stirring at a certain level has no or little influence on the water content and recovery rate.

Figure 5:
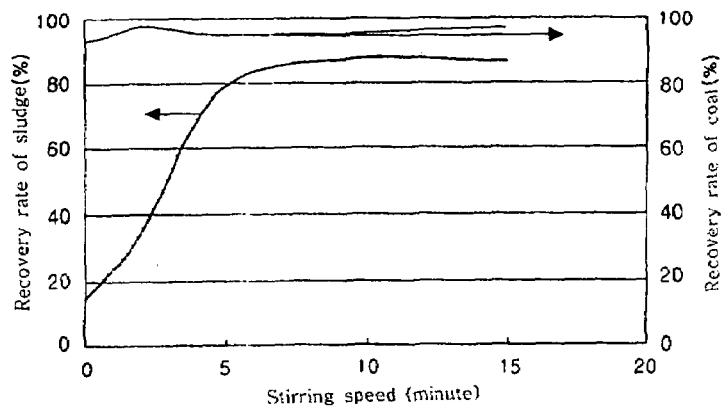
FIG. 5 is a graph showing change in the recovery rate of coal and sludge-coal agglomerates according to varying stirring and tumbling time.

When coal and sewage sludge having different physical properties and affinity with oil are tried to form an agglomerate with oil only, the agglomeration efficiency is poor. In order to improve the agglomeration efficiency, stirring is preferably carried out in two-stages or by tumbling. In this experiment, coal and sludge were stirred at 3,000 rpm for 10 minutes, and then the coal only was stirred in a separate tumbler. The sludge and the coal were slowly stirred at the same shear force in the same reactor. The experimental results are shown in FIG. 5.

As a result, the effect of the two-stage stirring and tumbling on the coal was no or little, but the effect on the sludge was very considerable. In particular, the two-stage stirring and tumbling was suitable for simultaneous recovery of sludge/coal agglomerates. The effect of tumbling time on the coal was no or little, but it is preferred that the tumbling of the sludge/coal agglomerates is further sustained for 5 minutes or more.

II. Improvement in Purification of Heavy Metals and Heating Value

Coal used in the present experiment contained 9.09% of ash components, and had a heating value of 6,690 kcal/kg. The contents of non-volatile components in mixed sludge, aerobically treated sludge and anaerobically treated sludge used in the present experiment were about 30%, 12.5% and 38%, respectively. Each sludge had a heating value of about 1,200~4,500 kcal/kg. Heavy oil (A) having a heating value of 10,450 kcal/kg was added to each sludge to form sludge-coal-oil gglomerates. The results obtained from the respective agglomerates are shown in Table 2 below.

TABLE 2

Content of inorganic components (ash) in sludge-coal-oil agglomerates and heat values of the agglomerates

| Sludge | Coal/Sludge | Oil/Sludge | Water content in agglomerates (%) | Ash (%) | Heating value (kcal/kg) |
|---|---|---|---|---|---|
| Mixed sludge | 5.68 | 1.99 | 63.0 | 4.26 | 7.410 |
| Aerobically treated sludge | 4.35 | 1.74 | 29.7 | 5.17 | 7.351 |
| Anaerobically treated sludge | 1.43 | 0.43 | 33.5 | 3.06 | 7.139 |

The optimum mixing ratio of the sludge to the coal is dominantly influenced by the physical properties of the sludge and the coal. In this experiment, the respective mixing ratios were controlled within the range of about 1:1~6, as shown in Table 2. The oil was added in a ratio of about 0.4~2.0, based on the sludge. The addition of oil increased the heating value of the agglomerates to about 7,140~7,400 kcal/kg. In addition, the ash contents in the agglomerates were in the range of 3~5.2%. As a result, purified sludge containing less inorganic materials than the initial coal or sludge was recovered.

On the other hand, changes in the content of sulfur components among inorganic materials by oil agglomeration are shown in Table 3 below.

sulfates among sulfur components were easily separated, pyrites free from coal were easily separated, but organic sulfates were still present in the agglomerates.

The content of Na in the entering sludge was about 765 ppm, but that in the purified sludge was lower than 10 ppm, which indicates that the method of the present invention is very effective for purifying and separating heavy metals contained in sludge.

III. Improvement of Chromaticity, Turbidity and COD

Aerobically treated sludge introduced into an agglomeration reactor had a TCOD of about 10,700 ppm and a UV transmittance of about 74% at 275 nm. After completion of SOCA preparing procedure, the transmittance was increased to 92% or higher. Although the agglomerates were slightly turbid due to the presence of ash residues, they exhibited an improved COD of about 290 ppm. In the case of anaerobically digested sludge, the UV transmittance was about 33% at 275 nm. After SOCA fabrication, the UV transmittance was greatly increased to about 82%. However, in the case of mixed sludge, the UV transmittance was somewhat increased from 59% to 74% at 275 nm after agglomeration. This result was due to the presence of primary sludge passed through a sedimentation tank within the mixed sludge. In conclusion, the agglomeration of sludge with oil can greatly improve the chromaticity, turbidity and COD.

TABLE 3

Desulfurization effect of coal by oil agglomeration (unit: %)

| | Raw coal before oil agglomeration | | | | Secondary liquid | | Purified coal after oil agglomeration | | | |
|---|---|---|---|---|---|---|---|---|---|---|
| Coal | Total S | Sulfate | Pyrite | Org. S | Oil | Amount | Total S | Sulfate | Pyrite | Org. S |
| 1) | 0.92 | 0.05 | 0.52 | 0.35 | Light oil | 12.5 | 0.59 | 0.00 | 0.36 | 0.23 |
| 2) | 0.46 | 0.02 | 0.42 | 0.02 | Kerosene | 15 | 0.24 | 0.00 | 0.14 | 0.10 |
| 2) | 0.46 | 0.02 | 0.42 | 0.02 | Light oil | 15 | 0.35 | 0.00 | 0.17 | 0.18 |
| 3) | 0.99 | 0.38 | 0.42 | 0.19 | Light oil | 30 | 0.90 | 0.05 | 0.32 | 0.53 |
| 4) | 0.81 | 0.19 | 0.40 | 0.22 | Light oil | 35 | 0.68 | 0.03 | 0.19 | 0.46 |

*Note:
[1] produced from a mine in Eunsung, Korea
[2] produced from a mine in Jangsung, Korea
[3] imported from Republic of South Africa
[4] produced from a mine in Datong, China The data shown in Table 3 are those obtained by simple oil agglomeration without any pretreatment. Hydrophilic As apparent from the above description, the present invention provides a novel conceptual method for dewatering sewage sludge by replacing water present on the surface of sludge with oil and screening the sludge-oil agglomerates, thereby effectively dewatering and purifying the sludge. According to the method of the present invention, since sludge can be rapidly, easily and effectively dewatered when compared to conventional sludge treatment methods using filters, facilities associated with sludge treatment can be greatly simplified. In addition, there is no risk of involving malodor and air pollution. Furthermore, the method of the present invention provides a new and useful effect that the dewatered sludge can be used as a high-quality fuel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for dewatering sewage sludge by using sludge-coal-oil co-agglomeration ("SOCA"), comprising the steps of:
   physically, chemically or biologically conditioning sludge to impart hydrophobicity and lipophilicity to the sludge (conditioning step);
   supplying oil and coal to the conditioned sludge with stirring to form sludge-coal-oil agglomerates comprising separated organic materials having a diameter of 500 μm or higher (agglomerating step);
   enlarging the particle diameter of sludge-coal-oil agglomerates to the range from 0.5 mm to 3.0 by increasing the agglomeration force of the sludge-coal-oil agglomerates by stirring the agglomerates at a low speed using an agitator, pan-disk or tumbler, after the agglomerating step (size enlargement step);
   passing water with the enlarged sludge-coal-oil agglomerates and unagglomerated inorganic materials through a sieve having 48 mesh or less to selectively separate the enlarged sludge-coal-oil agglomerates (screening step); and
   spray-washing and dewatering the enlarged sludged-coal-oil agglomerates after they are selectively separated from the unagglomerated inorganic materials.

2. The method according to claim 1, wherein the agglomerating step is carried out by separately agglomerating the conditioned sludge and coal with oil (a first agglomeration), mixing the first agglomerates, and agglomerating the mixture (a second agglomeration).

3. The method according to claim 1, wherein the agglomerating step is carried out by agglomerating the conditioned sludge with oil (a first agglomeration), adding coal and oil to the first agglomerates, and agglomerating the mixture (a second agglomeration).

4. The method according to claim 1, wherein the agglomerating step is carried out by agglomerating coal with oil (a first agglomeration), adding the conditioned sludge to the first agglomerates, and agglomerating the mixture (a second agglomeration).

5. The method according to claim 1, wherein the oil used in the agglomerating step is selected from heavy oil, light oil, kerosene, cooking oil, waste cooking oil, castor oil, soybean oil, hempseed oil, waste lubricant and mixtures thereof.

* * * * *